US012599791B2

(12) United States Patent
Lopez

(10) Patent No.: US 12,599,791 B2
(45) Date of Patent: Apr. 14, 2026

(54) SELF-RETRACTING LIFELINE HOUSING

(71) Applicant: WERNER CO., Greenville, PA (US)

(72) Inventor: Ivan D. Lopez, Hermitage, PA (US)

(73) Assignee: Werner Co., Itasca, IL (US)

( * ) Notice: Subject to any disclaimer, the term of this patent is extended or adjusted under 35 U.S.C. 154(b) by 1411 days.

(21) Appl. No.: 17/113,558

(22) Filed: Dec. 7, 2020

(65) Prior Publication Data

US 2022/0176173 A1 Jun. 9, 2022

(51) Int. Cl.

*A62B 35/00* (2006.01)
*A62B 35/04* (2006.01)
*B65H 75/44* (2006.01)

(52) U.S. Cl.

CPC .......... *A62B 35/0093* (2013.01); *A62B 35/04* (2013.01); *B65H 75/4471* (2013.01)

(58) Field of Classification Search

CPC ....... A62B 35/0093; A62B 35/04; A62B 1/06; A62B 1/08; A62B 1/10; A62B 35/0043; A62B 35/005; A62B 35/0056

See application file for complete search history.

(56) References Cited

U.S. PATENT DOCUMENTS 5,842,542 A * 12/1998 Tien .......................... A62B 1/14 182/240
6,467,574 B2 * 10/2002 Lara ................... A62B 35/0087 182/36
6,793,046 B2 * 9/2004 Petzl ......................... A62B 1/14 188/65.1
7,347,300 B2 * 3/2008 Renton .............. A62B 35/0056 182/36
7,870,934 B2 * 1/2011 Ecker ........................ A62B 1/08 182/234
7,946,387 B2 * 5/2011 Betcher .............. A62B 35/0093 182/232
8,226,024 B2 * 7/2012 Meillet .............. A62B 35/0093 242/380
8,245,817 B2 * 8/2012 Casebolt .................. A62B 1/10 182/75

(Continued)

FOREIGN PATENT DOCUMENTS

TW M404024 U 5/2011
TW M533998 U 12/2016

(Continued)

OTHER PUBLICATIONS

Taiwanese Patent Office Action for Application No. 110137118 dated Nov. 27, 2025 (22 pages including English translation).

(Continued)

*Primary Examiner* — Jessica L Laux
*Assistant Examiner* — Kathleen M. McFarland
(74) *Attorney, Agent, or Firm* — Michael Best & Friedrich LLP

(57) ABSTRACT

A housing for a self-retracting lifeline includes an outer area disposed on a portion of a first side of the housing, the outer area being planar, a label area stepped down from the outer area, an outer perimeter of the label area corresponding to an inner perimeter of the outer area, and a number of protruding members disposed at least on a portion of the first side of the housing and being stepped up from the outer area.

17 Claims, 14 Drawing Sheets

(56) References Cited

U.S. PATENT DOCUMENTS

| | | | | |
|---|---|---|---|---|
| 8,469,149 | B2 * | 6/2013 | Meillet | B66D 1/54 242/378.2 |
| 8,584,797 | B2 * | 11/2013 | Krauss | E06C 7/187 182/36 |
| 8,739,929 | B2 | 6/2014 | Meillet et al. | |
| 8,757,532 | B2 * | 6/2014 | Votel | B65H 75/48 242/378 |
| 8,800,719 | B2 * | 8/2014 | Auston | A62B 35/0093 188/65.1 |
| 8,931,593 | B2 * | 1/2015 | Harris, Jr. | A62B 35/0093 188/65.5 |
| 8,991,556 | B2 * | 3/2015 | Auston | B65H 75/28 182/234 |
| 9,121,462 | B2 | 9/2015 | Casebolt | |
| 9,174,073 | B2 * | 11/2015 | Casebolt | A62B 35/04 |
| 9,925,400 | B2 * | 3/2018 | Casebolt | A62B 35/0093 |
| 10,004,927 | B2 | 6/2018 | Choate et al. | |
| 10,265,555 | B2 * | 4/2019 | Wu | A62B 35/0093 |
| 10,391,339 | B2 | 8/2019 | Sun | |
| 10,576,310 | B2 * | 3/2020 | Hung | A62B 35/0025 |
| 10,688,323 | B2 * | 6/2020 | Wolner | A62B 1/10 |
| 10,744,354 | B2 * | 8/2020 | Choate | A62B 35/0093 |
| 10,960,242 | B2 * | 3/2021 | Wang | A62B 35/0093 |
| 11,298,572 | B2 * | 4/2022 | Dillon | A62B 35/0075 |
| 11,541,256 | B2 * | 1/2023 | Blackford | G08B 21/043 |
| 2005/0039981 | A1 * | 2/2005 | Wooster | A62B 1/10 182/75 |
| 2009/0211849 | A1 * | 8/2009 | Smith | A62B 35/0037 182/236 |
| 2010/0122874 | A1 * | 5/2010 | Harris, Jr. | A62B 1/14 182/5 |
| 2010/0282541 | A1 * | 11/2010 | Renton | A62B 1/18 182/234 |
| 2012/0205478 | A1 * | 8/2012 | Balquist | A62B 35/04 242/380 |
| 2015/0208614 | A1 * | 7/2015 | Vaccari | A01K 27/004 119/796 |
| 2016/0096048 | A1 | 4/2016 | Fegley et al. | |
| 2017/0312559 | A1 * | 11/2017 | Dyer | A62B 35/0068 |
| 2017/0361136 | A1 * | 12/2017 | Wu | A62B 35/0093 |
| 2019/0083826 | A1 * | 3/2019 | Sun | A62B 35/0093 |
| 2019/0209877 | A1 | 7/2019 | Farrell | |
| 2019/0209878 | A1 * | 7/2019 | Newing | F16G 11/12 |
| 2019/0275356 | A1 * | 9/2019 | Jones | A62B 35/0093 |
| 2020/0078618 | A1 * | 3/2020 | Wang | B65H 75/40 |
| 2020/0078620 | A1 * | 3/2020 | Wang | A62B 35/0093 |
| 2020/0078621 | A1 | 3/2020 | Chen et al. | |
| 2020/0330800 | A1 * | 10/2020 | Pan | A62B 1/16 |
| 2020/0360740 | A1 * | 11/2020 | Jones | E04G 21/3204 |
| 2023/0256273 | A1 * | 8/2023 | King | A62B 35/0093 182/231 |
| 2023/0271039 | A1 * | 8/2023 | Shrank | F16D 59/00 182/232 |

FOREIGN PATENT DOCUMENTS

| | | | |
|---|---|---|---|
| TW | M554490 | U | 1/2018 |
| TW | M555231 | U | 2/2018 |
| TW | 201902538 | A | 1/2019 |
| TW | M572764 | U | 1/2019 |
| TW | M572767 | U | 1/2019 |
| TW | M572768 | U | 1/2019 |
| TW | 201914647 | A | 4/2019 |
| WO | 2018/071646 | A1 | 4/2018 |

OTHER PUBLICATIONS

Taiwanese Patent Office Action for Application No. 110137118 dated Jul. 7, 2025 (6 pages including machine English translation).

* cited by examiner

SELF-RETRACTING LIFELINE HOUSING

BACKGROUND

Field

The disclosed concept relates generally to fall protection systems, and in particular, to a housing for a self-retracting lifeline used in fall protection systems.

Background Information

In fall protection systems, a worker typically wears a harness. In some systems, a lifeline is attached to an attachment point on the harness and to an anchor point on a building, connecting the worker to the anchor point. In the case of a fall, the lifeline will arrest the fall, preventing injury to the worker. There are numerous in types of lifelines, harnesses, and types of anchor points used, but the principle of arresting the fall is generally similar.

One type of lifeline is a self-retracting lifeline. A self-retracting lifeline typically includes a retracting device into which the lifeline is retracted. The lifeline can be pulled out of the retracting device under normal forces, such as a worker walking away from the anchor point. This allows the lifeline to remain under some tension. The retracting device also includes a braking mechanism. When the lifeline is quickly pulled out of the retracting device, such as when a fall occurs, the braking mechanism engages to slow and stop the lifeline from being pulled out of the retracting device and, in this manner, arrests the fall of the worker.

In transport and in use, a self-retracting lifeline is can become damaged due to dropped, bumped against objects, subjected to various weather conditions, or any other hazards that may arise. In particular, the retracting device should be protected because, if it were to become damaged, it may not operate properly in the case of a fall. The retracting device is typically contained in a housing, but there remains room for improvement in housings for self-retracting lifelines.

SUMMARY

These needs and others are met by embodiments of the disclosed concept in which a housing for a self-retracting lifeline includes one or more protruding members.

In accordance with one aspect of the disclosed concept, a housing for a self-retracting lifeline comprises an outer area disposed on a portion of a first side of the housing, the outer area being planar; a label area stepped down from the outer area, an outer perimeter of the label area corresponding to an inner perimeter of the outer area; and a number of protruding members disposed at least on a portion of the first side of the housing and being stepped up from the outer area.

In accordance with on aspect of the disclosed concept, a self-retracting lifeline comprises: a housing including: an outer area disposed on a portion of a first side of the housing, the outer area being planar; a label area stepped down from the outer area, an outer perimeter of the label area corresponding to an inner perimeter of the outer area; and a number of protruding members disposed at least on a portion of the first side of the housing and being stepped up from the outer area; a retractable device disposed within the housing; a first attachment mechanism attached proximate a top of the housing; a lifeline extending from the housing; an energy absorber attached to the lifeline; and a second attachment mechanism attached to the energy absorber.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
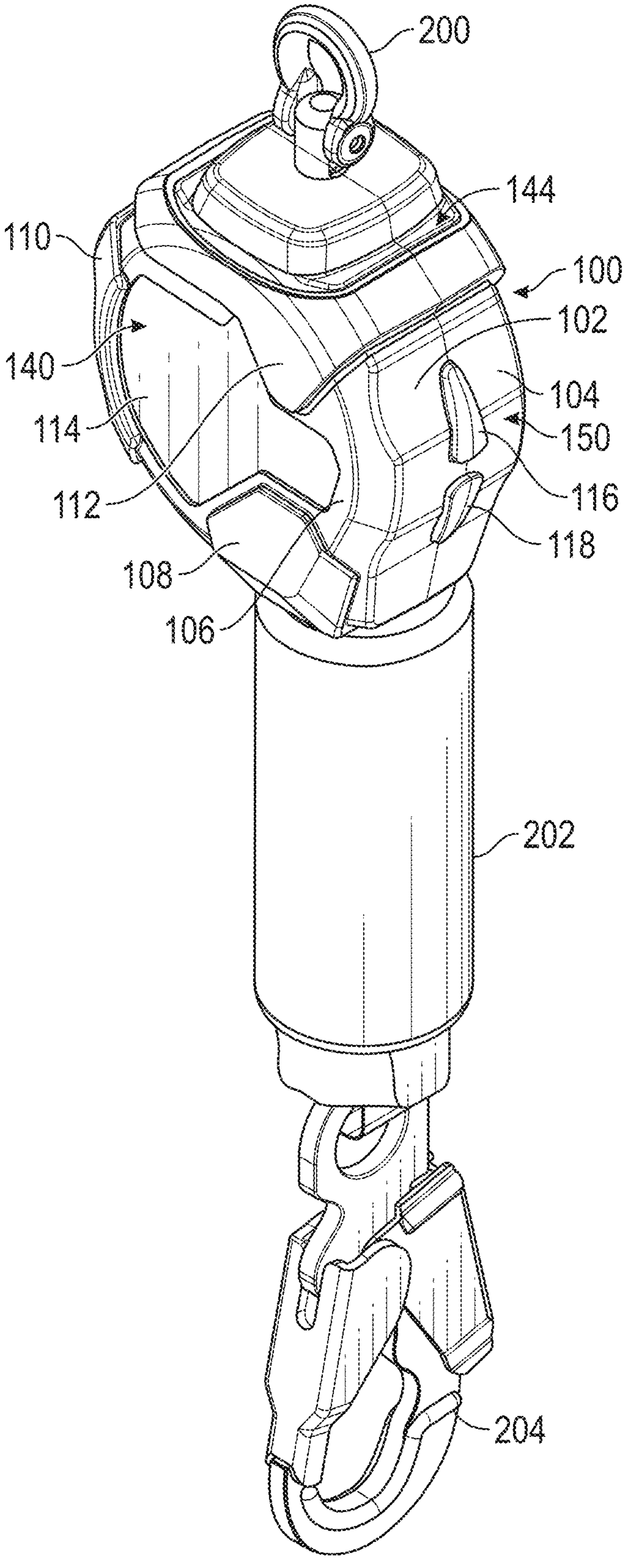
FIG. 1 is an isometric view of a self-retracting lifeline including a housing in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

In accordance with some example embodiments of the disclosed concept, a housing for a self-retracting lifeline. In some example embodiments, the housing includes a label area and multiple step-downs in the housing protect the label area. Some features that create the multiple step-downs also protect the integrity of the housing. In some example embodiments of the disclosed concept, the housing includes a retractable handle that eases carrying of the self-retracting lifeline. Some example embodiments of the disclosed concept will be described in more detail herein.

Figure 2:
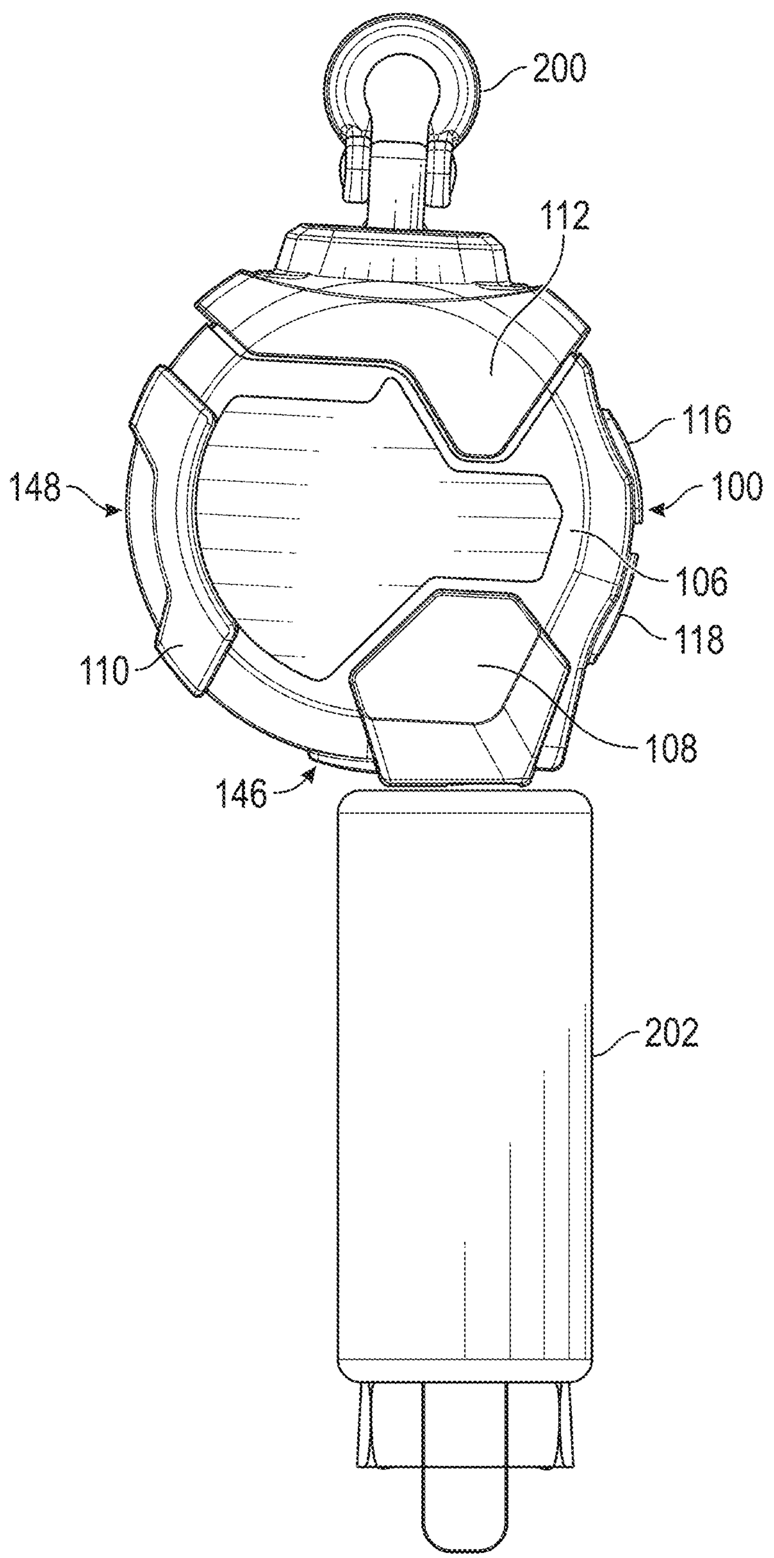
FIG. 2 is a first side view of the self-retracting lifeline of FIG. 1.
Figure 3:
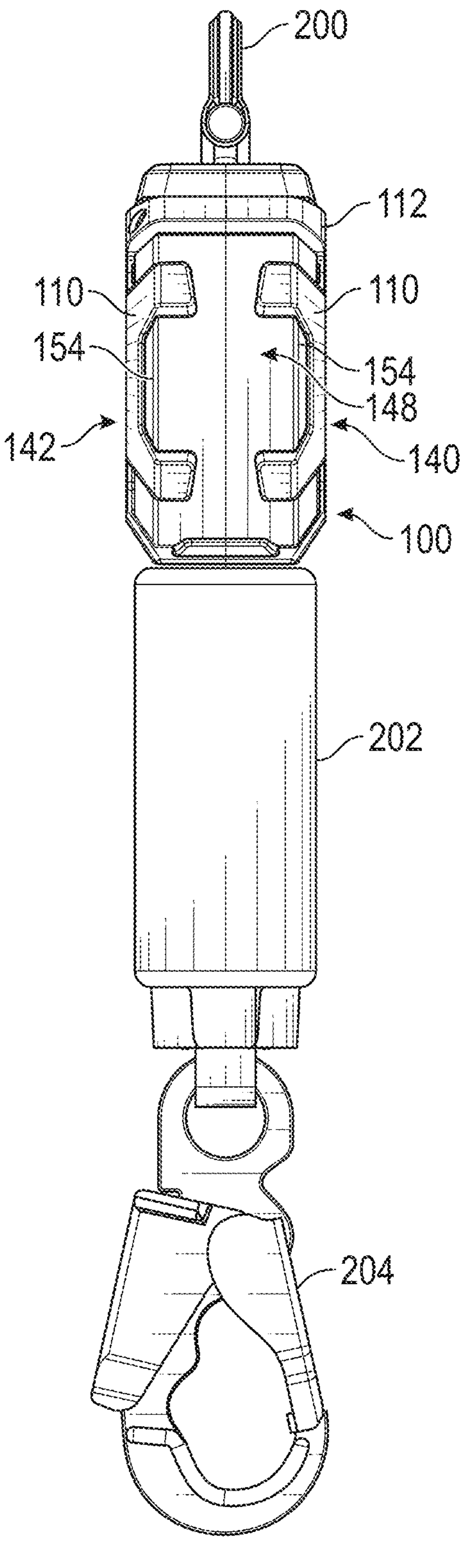
FIG. 3 is a front side view of the self-retracting lifeline of FIG. 1.
Figure 4:
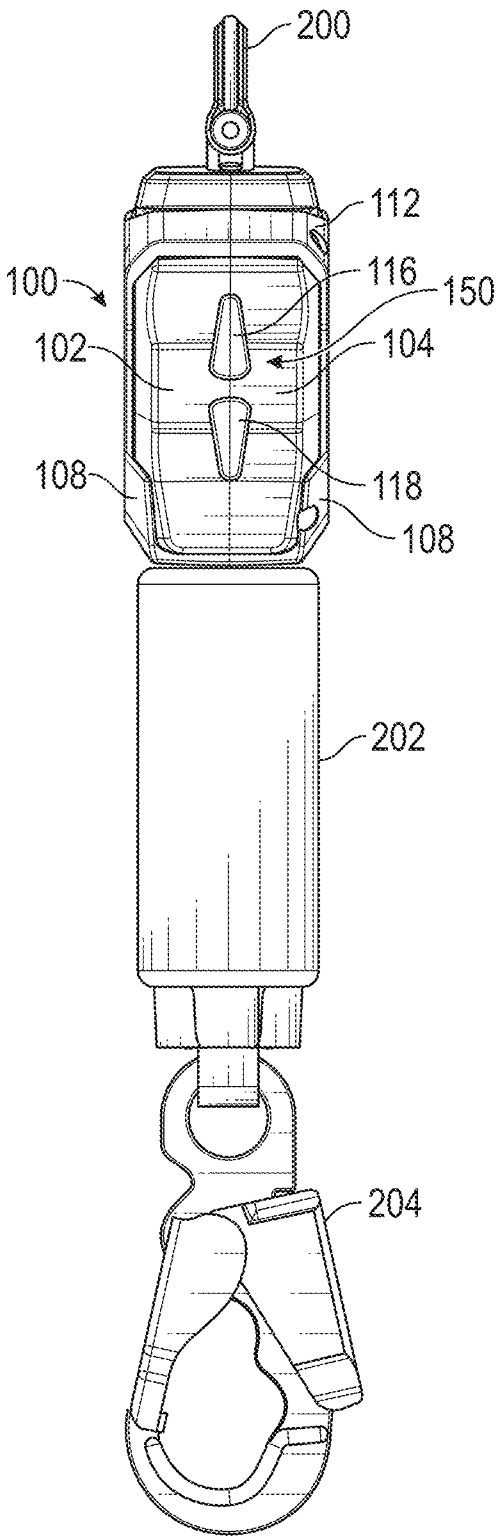
FIG. 4 is a second side view of the self-retracting lifeline of FIG. 1.
Figure 5:
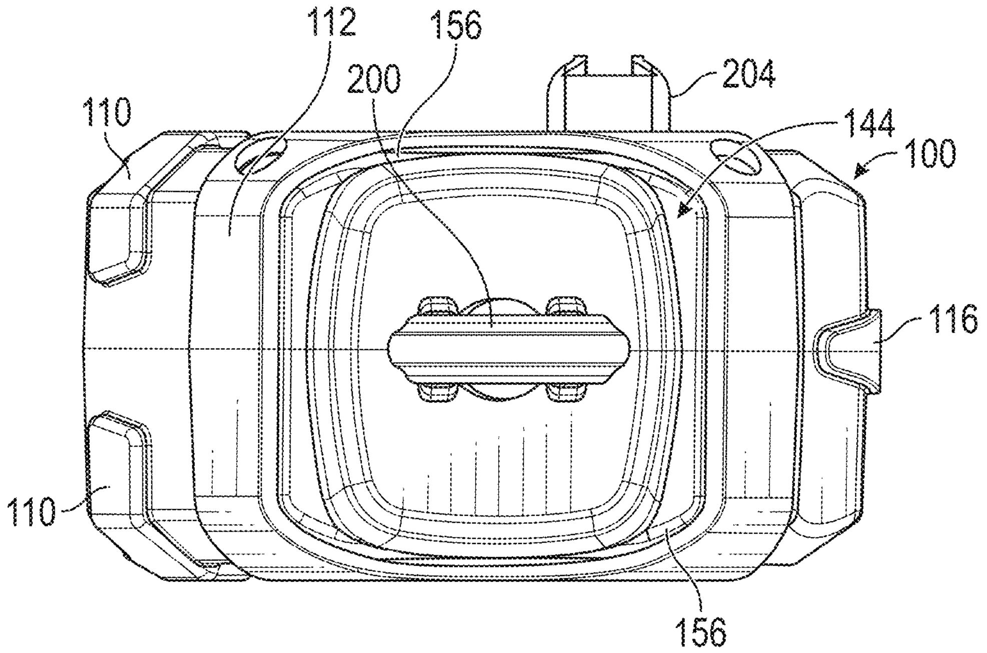
FIG. 5 is a top view of the self-retracting lifeline of FIG. 1.
Figure 6:
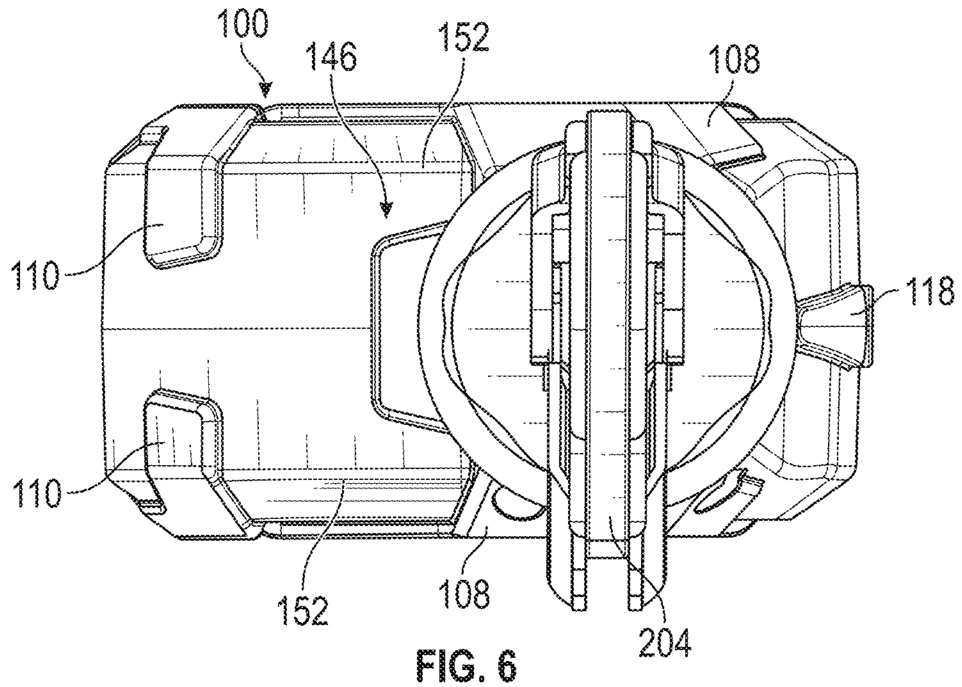
FIG. 6 is a bottom view of the self-retracting lifeline of FIG. 1.

FIG. 1 is an isometric view of a self-retracting lifeline including a housing 100 in accordance with an example embodiment of the disclosed concept. FIG. 2 is a first side view of the self-retracting lifeline of FIG. 1, FIG. 3 is a front side view of the self-retracting lifeline of FIG. 1, FIG. 4 is a second side view of the self-retracting lifeline of FIG. 1, FIG. 5 is a top view of the self-retracting lifeline of FIG. 1, and FIG. 6 is a bottom view of the self-retracting lifeline of FIG. 1. The self-retracting lifeline includes the housing 100, an attachment ring 200 for attaching to an attachment point on a harness, an energy absorber 202, and a hook 204 for attaching to an anchor point. A retracting device may be disposed within the housing 100 and includes a lifeline attached to the energy absorber.

The housing 100 includes a two-part body formed from a first body part 102 and a second body part 104. The first body part 102 and the second body 104 form halves of the housing 100 and attach together to form the housing 100. The housing 100 includes a number of features. One such feature is a planar outer area 106 formed on sides of the housing 100. Stepped down from the outer area 106 is a planar label area 114. The outer area 106 surrounds the label area 114. The extents of the label area 114 are defined by a step which steps up to the outer area 106. In the example embodiment shown in FIG. 1, the perimeter of the label area 114 has an arc shape on one side. Moving toward the opposite side of the label area 114 are angled perimeter sections followed by substantially parallel perimeter sections, as are shown in FIG. 1. The label area 114 is wider on the side of the arc shaped perimeter section and narrower on the opposite side. However, it will be appreciated that modifications may be made to the shape of the perimeter of the label area 114 without departing from the scope of the disclosed concept. Stepping down the label area 114 from the outer area 106 provides protection for the label area 114. Due to its protection, the label area 114 is a useful area for placing a label, such as a label including brand information, safety information, or any other type of information. The label will be protected from being scuffed or otherwise damaged by general impacts on the housing 100.

Another feature is a first protruding member 108. The first protruding member 108 is located on a lower part of the housing 108 and is stepped up from the outer area 106. The first protruding member 108 extends from a portion of a first side 140 of the housing 100, across a bottom 146 and bottom edges 152 of the housing 100, and into a portion of an opposite second side 142 of the housing 100. The first protruding member 108 may have a portion of its perimeter correspond in shape to a portion of the perimeter of the label area 114. By being stepped up from the outer area 106, the first protruding member 108 may provide protection from impacts to the housing 100. In some example embodiments, the first protruding member 108 may be part of the first and second body parts 102,104. For example, half of the first protruding member may be part of the first body part 102 and the other half of the first protruding member 108 may be part of the second body part 104. In an example embodiment, the first body part 102 and half of the first protruding member 108 may be a unitary piece formed together, for example and without limitation, in a molding process. Similarly, the second body part 104 and the other half of the first protruding member 108 may be a unitary piece. When the first and second body parts 102,104 are brought together to form the housing 100, the halves of the first protruding member 108 may abut together to form a continuous protrusion on the housing 100.

Second protruding members 110 are another feature of the housing 100. Second protruding members 110 being on opposite sides of the housing 100 and extend across front edges of the housing 100. Second protruding members 110 are also stepped up from outer area 106. Second protruding members 110 may each have an arc shaped edge that corresponds in shape to a portion of the arc shaped perimeter section of the label area 114. Protruding members 110 each have a body section disposed on sides of the housing 110 and prong sections that extend across a front edge 154 of the housing 100. One second protruding member 110 may be part of the first body part 102 and the other second protruding member 110 may be part of the second part 104. There may be a space between the second protruding members 110 on a front side 148 of the housing 100 when the first and second parts 102,104 are brought together to form the housing. The second protruding members 110 provide protection to the housing 100 and, in particular, to front edges 154 of the housing 100 that may be susceptible to impacts.

A third protruding member 112 is another feature of the housing 100. The third protruding member 112 begins on the first side 140 of the housing 100, extends across a top 144 of the housing 100, and ends on the second side 142 of the housing 100. The third protruding member 112 includes an opening on the top 144 of the housing 100. The opening allows a point where the attachment ring 200 may be connected. The third protruding member 112 is stepped up from the outer area 106 and extends along a portion of top edges 156 of the housing 100. The third protruding member 112 also provides protection against impacts to the housing 100.

Fourth and fifth protruding members 116,118 are also features of the housing 100. Fourth and fifth protruding members 116,118 are disposed on a back side 150 of the housing 100. Fourth and fifth protruding members 116,118 are stepped up portions that may be spaced apart from each other. Fourth and fifth protruding members 116,118 may extend across an area with the first and second body parts 102,104 meet. In some example embodiments, fourth and fifth protruding members 116,118 may have tapered elongated shapes. However, it will be understood that other shapes may be employed without departing from the scope of the disclosed concept. Fourth and fifth protruding members 116,118 may protect the housing 100 from impacts as well as provide structural support.

The first through third protruding members 108,110,112 along with the outer area 106 provide a multi-stepped geometry that protects the label area 114. For example, the outer area 106 is stepped up from the label area 114 and the first through third protruding members 108,110,112 are stepped up from the outer area 106, which creates multiple steps up from the label area 114. This multi-stepped protection provides protection for any label applied in the label area 114 and reduces the chances of a label being scuffed or otherwise damaged by impacts to the housing 100. The multi-stepped geometry also provide general protection to the housing 100 and structural support to the housing 100, making is less likely that impacts or other wear and tear will compromise the integrity of the housing 100.

In some example embodiments, the first through fifth protruding members 108,110,112,114,116 are integrally formed as parts of the first and second body parts 102,104, for example and without limitation, by molding. This integral construction provides structural support. However, it will be appreciated that in some example embodiments, one or more of the first through fifth protruding members 108, 110,112,114,116 may not be integral with the first and second body parts 102,104, and may instead be attached to the first and second body parts 102,104.

In some example embodiments, the housing 100 has a roughly cylindrical shape. However, it will be appreciated that variations may be made to the shape of the housing 100 without departing from the scope of the disclosed concept. It will also be appreciated that variations to the shapes of any other features of the housing 100 may be modified without departing from the scope of the disclosed concept. It will further be appreciated that one or more features may be added, removed, or modified without departing from the scope of the disclosed concept. Another example embodiment of the disclosed concept will also be described herein.

Figure 7:
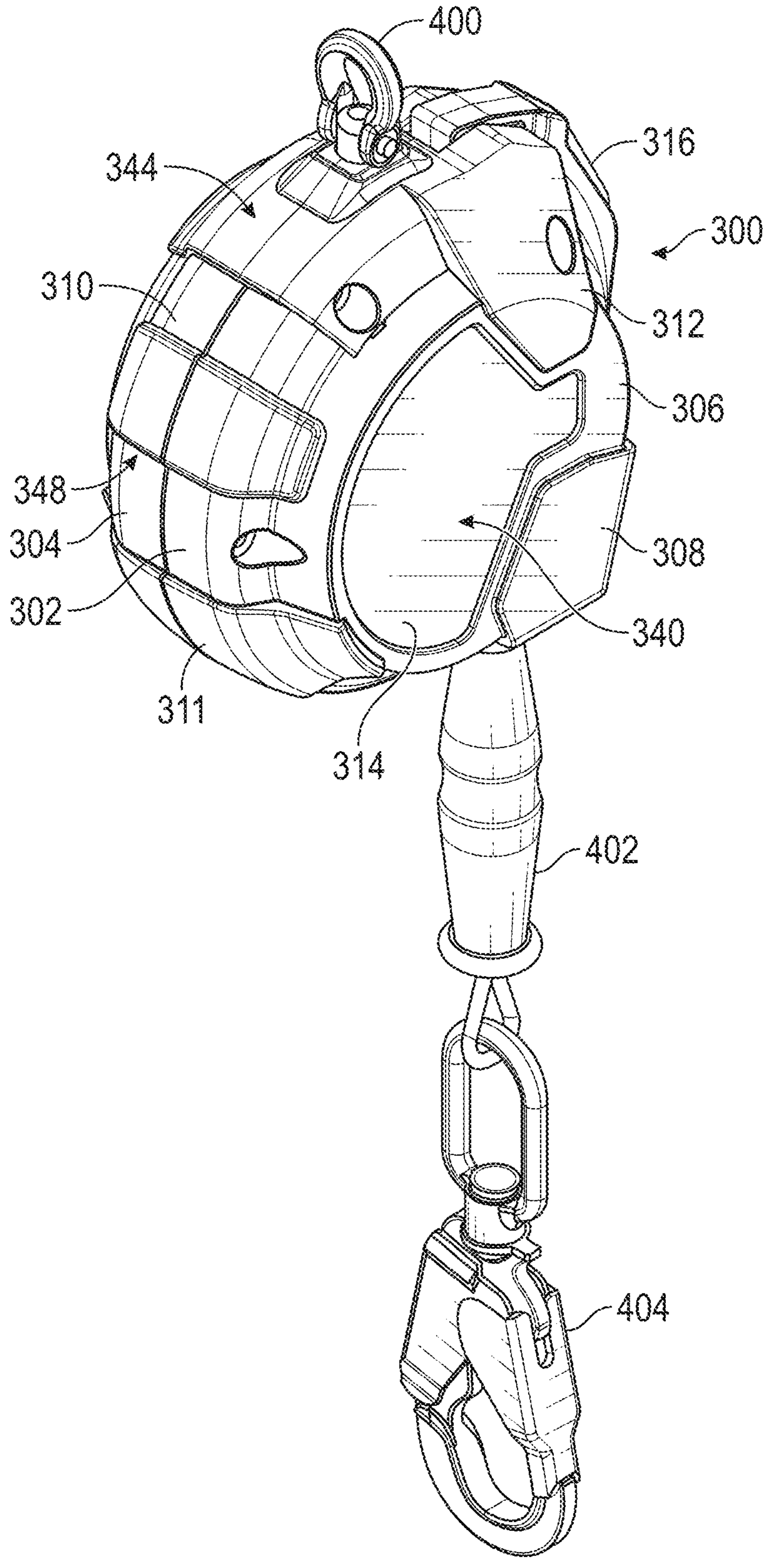
FIG. 7 is an isometric view of a self-retracting lifeline including a housing in accordance with another example embodiment of the disclosed concept.
Figure 8:
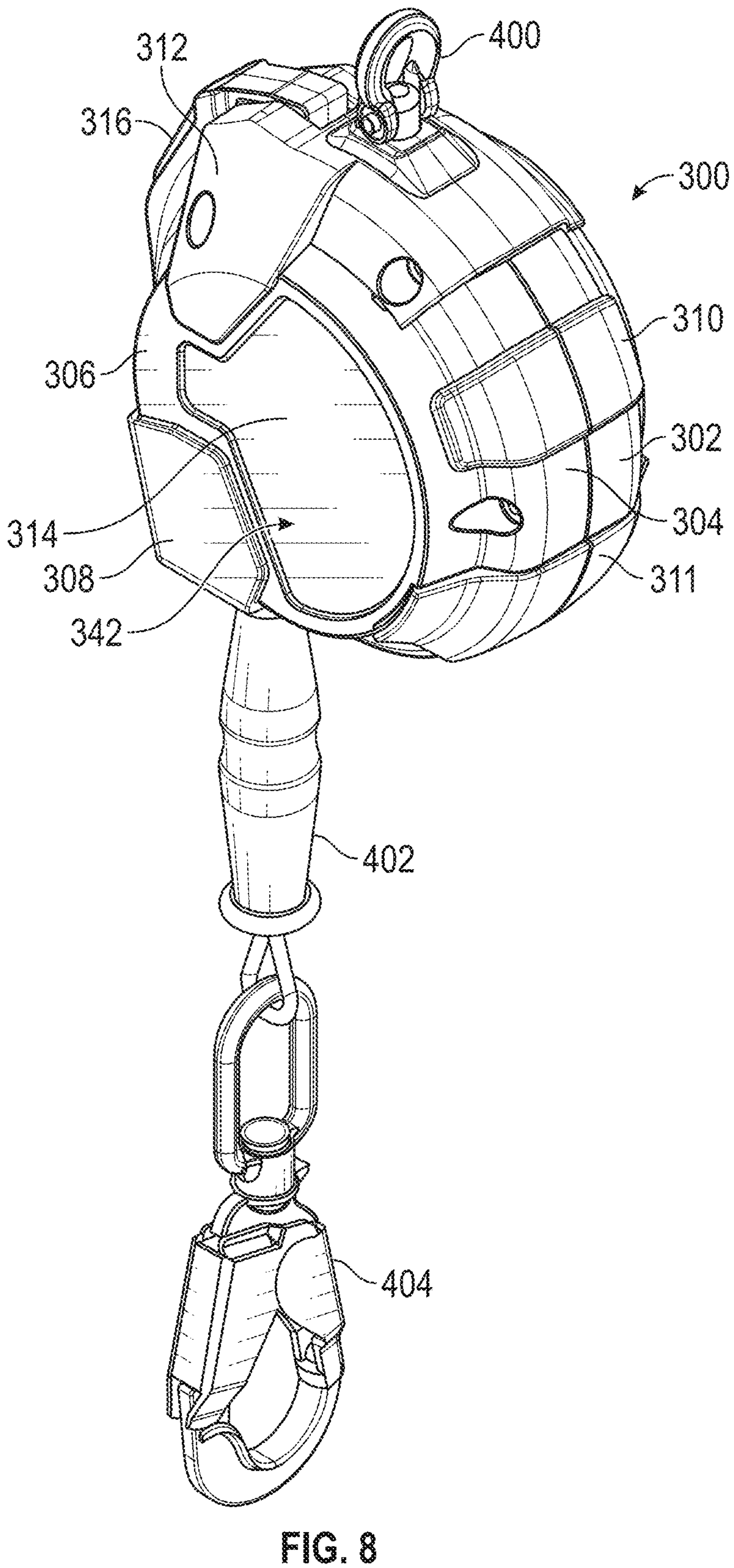
FIG. 8 is another isometric view of the self-retracting lifeline of FIG. 7.
Figure 9:
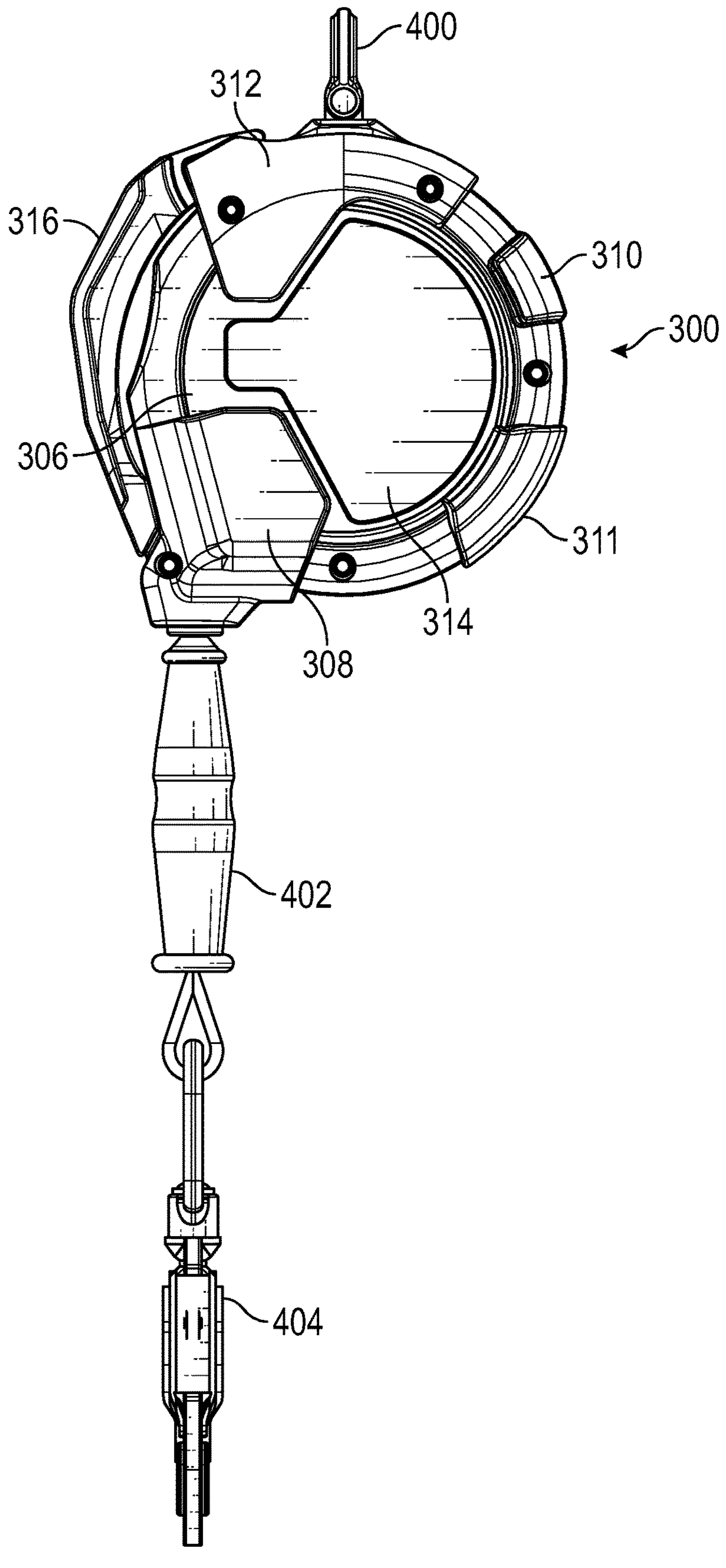
FIG. 9 is a first side view of the self-retracting lifeline of FIG. 7.
Figure 10:
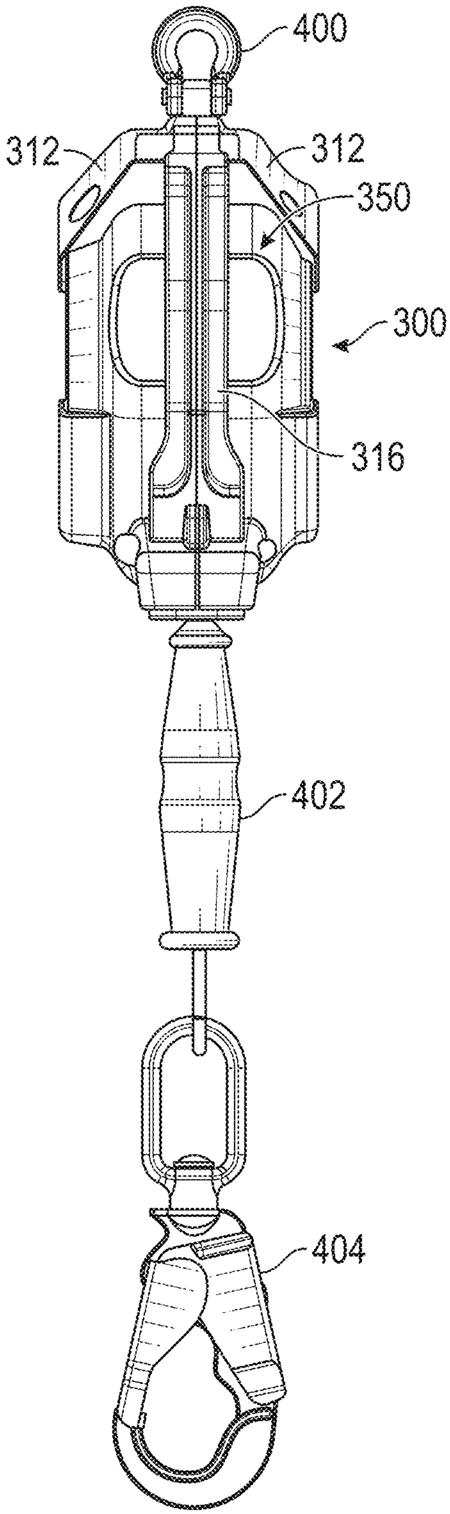
FIG. 10 is a back side view of the self-retracting lifeline of FIG. 7.
Figure 11:
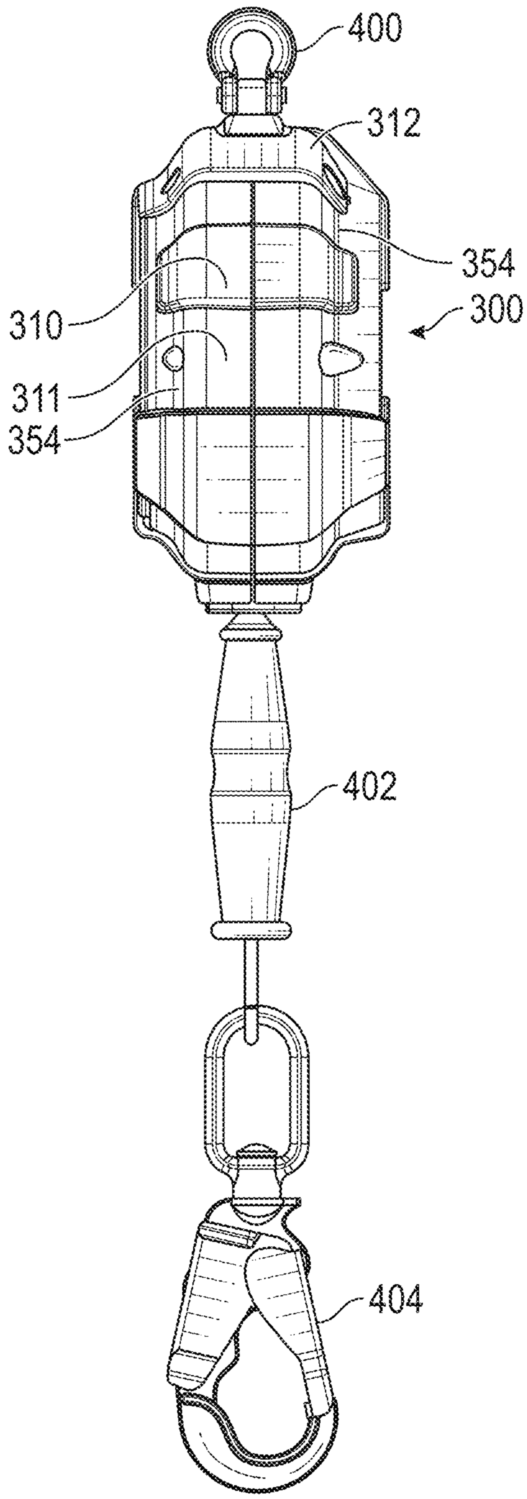
FIG. 11 is a front side view of the self-retracting lifeline of FIG. 7.
Figure 12:
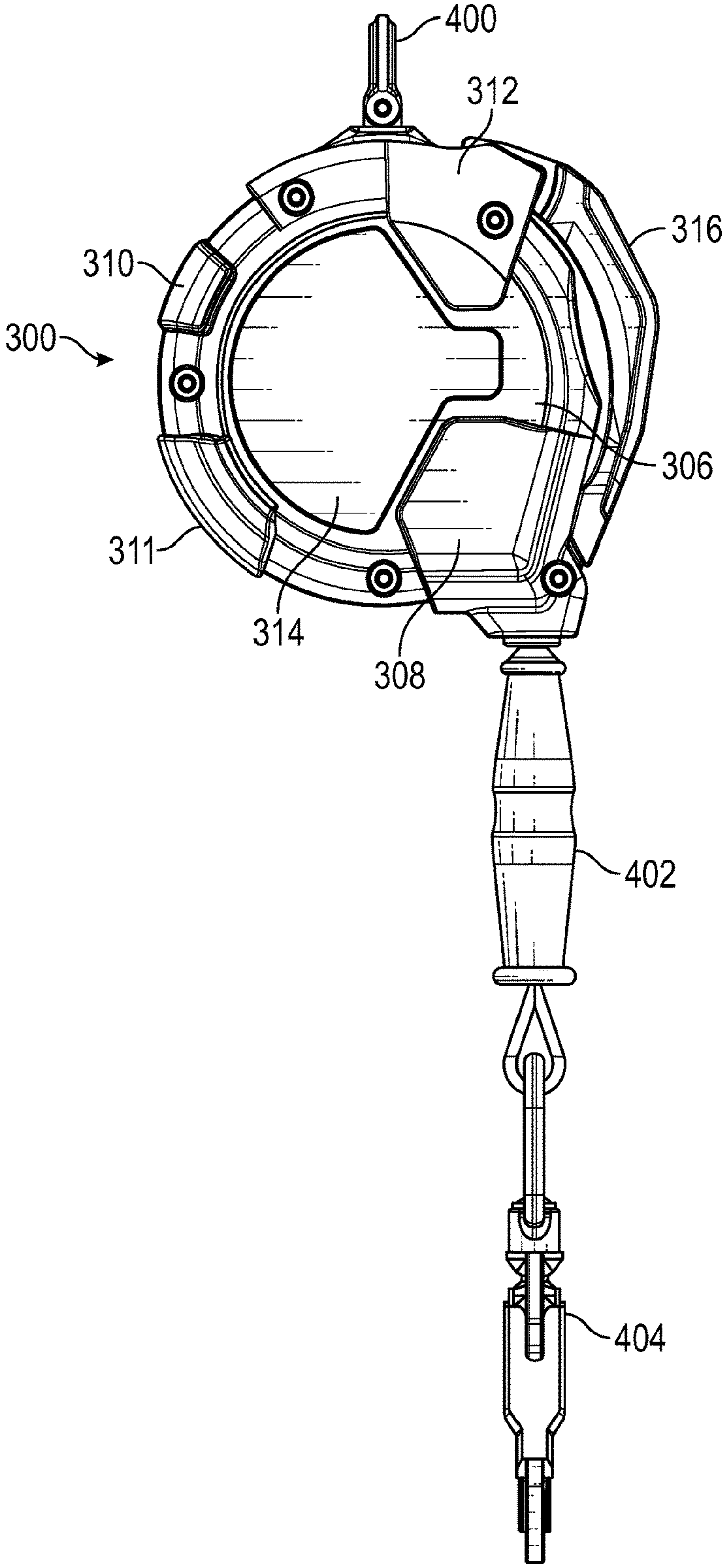
FIG. 12 is a second side view of the self-retracting lifeline of FIG. 7.
Figure 13:
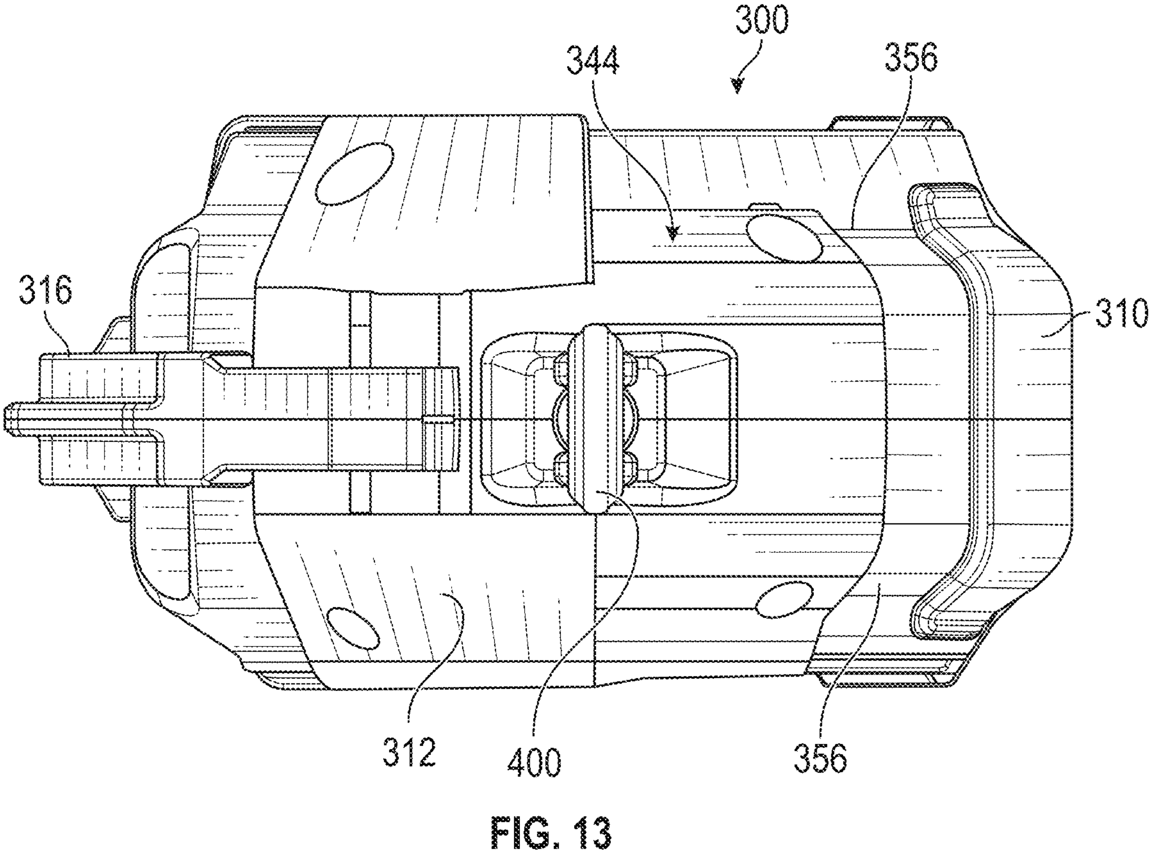
FIG. 13 is a top view of the self-retracting lifeline of FIG. 7.
Figure 14:
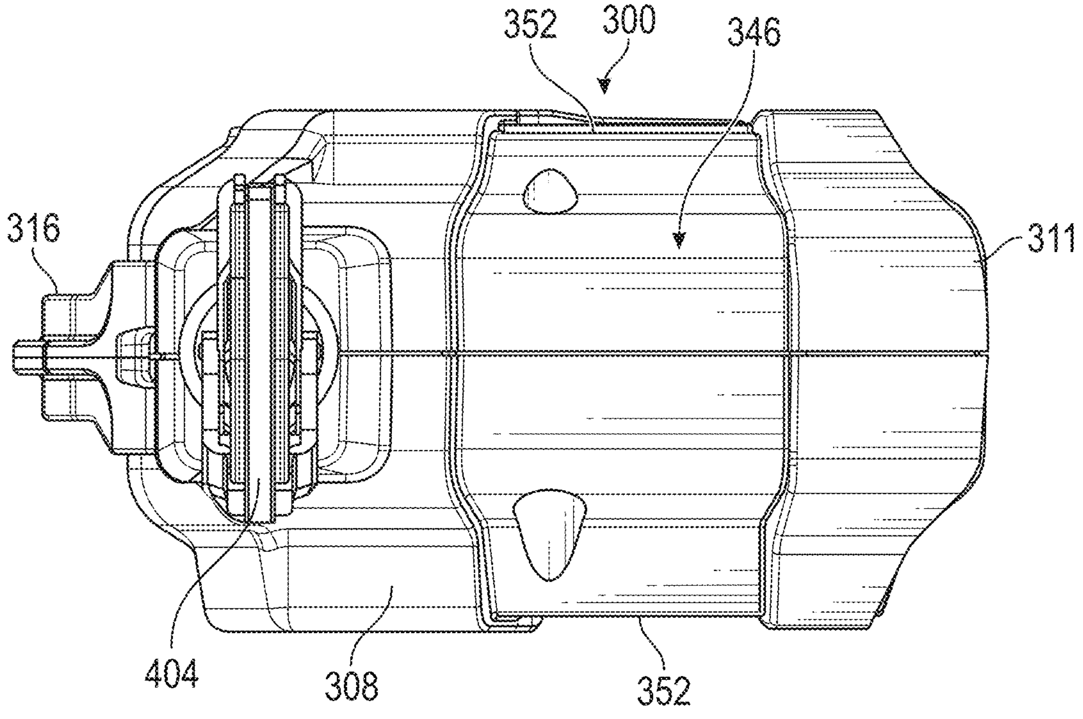
FIG. 14 is a bottom view of the self-retracting lifeline of FIG. 7.

FIG. 7 is an isometric view of a self-retracting lifeline including a housing 300 in accordance with another example embodiment of the disclosed concept. FIG. 8 is another isometric view of the self-retracting lifeline of FIG. 7, FIG. 9 is a first side view of the self-retracting lifeline of FIG. 7, FIG. 10 is a back side view of the self-retracting lifeline of FIG. 7, FIG. 11 is a front side view of the self-retracting lifeline of FIG. 7, FIG. 12 is a second side view of the self-retracting lifeline of FIG. 7, FIG. 13 is a top view of the self-retracting lifeline of FIG. 7, and FIG. 14 is a bottom view of the self-retracting lifeline of FIG. 7. The self-retracting lifeline includes the housing 300, an attachment ring 400 for attaching to an attachment point on a harness, an energy absorber 402, and a hook 404 for attaching to an anchor point. A retracting device may be disposed within the housing 400 and includes a lifeline attached to the energy absorber.

The housing 300 includes a two-part body formed from a first body part 302 and a second body part 304. The first body part 302 and the second body 304 form halves of the housing 300 and attach together to form the housing 300. The housing 300 includes a number of features. One such feature is a planar outer area 306 formed on sides of the housing 300. Stepped down from the outer area 306 is a planar label area 314. The outer area 306 surrounds the label area 314. The extents of the label area 314 are defined by a step which steps up to the outer area 306. In the example embodiment shown in FIG. 7, the perimeter of the label area 314 has an arc shape on one side. Moving toward the opposite side of the label area 314 are angled perimeter sections followed by substantially parallel perimeter sections, as are shown in FIG. 7. The label area 314 is wider on the side of the arc shaped perimeter section and narrower on the opposite side. However, it will be appreciated that modifications may be made to the shape of the perimeter of the label area 314 without departing from the scope of the disclosed concept. Stepping down the label area 314 from the outer area 106 provides protection for the label area 314. Due to its protection, the label area 314 is a useful area for placing a label, such as a label including brand information, safety information, or any other type of information. The label will be protected from being scuffed or otherwise damaged by general impacts on the housing 300.

The housing 300 also includes a first protruding member 308. The first protruding member 308 is located on a lower part of the housing 308 and is stepped up from the outer area 306. The first protruding member 308 extends from a portion of a first side 342 of the housing 300, across a bottom 346 and bottom edges 352 of the housing 300, and into a portion of an opposite second side 340 of the housing 300. The first protruding member 308 may have a portion of its perimeter correspond in shape to a portion of the perimeter of the label area 314. By being stepped up from the outer area 306, the first protruding member 308 may provide protection from impacts to the housing 300. In some example embodiments, the first protruding member 308 may be part of the first and second body parts 302,304. For example, half of the first protruding member may be part of the first body part 302 and the other half of the first protruding member 308 may be part of the second body part 304. In an example embodiment, the first body part 302 and half of the first protruding member 308 may be a unitary piece formed together, for example and without limitation, in a molding process. Similarly, the second body part 304 and the other half of the first protruding member 308 may be a unitary piece. When the first and second body parts 302,304 are brought together to form the housing 300, the halves of the first protruding member 308 may abut together to form a continuous protrusion on the housing 300.

The housing 300 also includes second and third protruding members 310,311. The second and third protruding members 310,311 are disposed on a front side 348 of the housing 300 and extend across a portion of the front edges 354 of the housing 300 onto sides of the housing 300. In an example embodiment, the third protruding member 311 is longer than the second protruding member 310. However, it will be appreciated that the lengths of the second and third protruding members 310,311 may be varied without departing from the scope of the disclosed concept. In an example embodiment, ends of the third protruding member 311 are stepped up from the outer area 306. In some example embodiments, the second protruding member 310 may also be stepped up from the outer area 306. In the example embodiment shown in FIG. 7 though, the second protruding member 310 does not extend into the outer area 306 while the third protruding member 311 does. In some example embodiments, the second and third protruding members 310,311 may be part of the first and second body parts 302,304. For example, half of the second and third protruding members 310,311 may be part of the first body part 302 and the other half of the second and third protruding member 310,311 may be part of the second body part 304. In an example embodiment, the first body part 302 and half of the second and third protruding members 310,311 may be a unitary piece formed together, for example and without limitation, in a molding process. Similarly, the second body part 304 and the other half of the second and third protruding members 310,311 may be a unitary piece. When the first and second body parts 302,304 are brought together to form the housing 300, the halves of the second and third protruding members 310,311 may abut together to form a continuous protrusion on the housing 300. The second and third protruding members 310,311 may provide protection to front edges of the housing 300 from impacts.

The housing 300 further includes a fourth protruding member 312. The fourth protruding member 312 begins on the first side 342 of the housing 300, extends across the top 344 of the housing 300, and ends on the secondo side 340 of the housing 300. The fourth protruding member 312 includes an opening on the top 344 of the housing 300. The opening allows a point where the attachment ring 400 may be connected. The fourth protruding member 312 is stepped up from the outer area 106 and extends along a portion of top edges 356 of the housing 300. The fourth protruding member 312 also provides protection against impacts to the housing 300. The fourth protruding member 312 may also have a cutout section where an end of a retractable handle 316 may be placed. The fourth protruding member 312 may be attached to the first and second body parts 302,304, rather than being formed as a unitary piece with them. However, it will be appreciated that in some example embodiments, the fourth protruding member 312 may be formed as a unitary piece with the first and second body parts 302,304.

The housing 300 also includes a retractable handle 316. The retractable handle 316 may attach at a top portion of the housing 300 and extend along a back side 350 of the housing 300. The retractable handle 316 may have a shape that substantially corresponds to a shape of the back side of the housing 300. The retractable handle 316 may have a retracted position and a non-retracted position. One end of the retractable handle 316 is attached at a top portion of the housing and the opposite end of the retractable handle 316 is not attached. In the non-retracted position, the unattached end of the retractable handle 316 is further from than back side of the housing 300 than when the retractable handle 316 is in the retracted position. In some example embodiments, the retractable handle 316 is biased toward the retracted position. By having an end of the retractable handle 316 unattached, a carabiner or other attachment device cannot be attached to the retractable handle 316 and the retractable handle 316 will not be mistaken for an attachment point by a worker. However, the retractable handle 316 does allow a worker to more easily carry the self-retracting lifeline.

The first, third, and fourth protruding members 308,311, 312 along with the outer area 306 provide a multi-stepped geometry that protects the label area 314. For example, the outer area 306 is stepped up from the label area 314 and the first, third, and fourth protruding members 308,311,312 are stepped up from the outer area 306, which creates multiple steps up from the label area 314. This multi-stepped protection provides protection for any label applied in the label area 314 and reduces the chances of a label being scuffed or otherwise damaged by impacts to the housing 300. The multi-stepped geometry also provide general protection to the housing 300 and structural support to the housing 300, making is less likely that impacts or other wear and tear will compromise the integrity of the housing 300.

In some example embodiments, the first through fourth protruding members 308,310,311,312 are integrally formed as parts of the first and second body parts 302,304, for example and without limitation, by molding. This integral construction provides structural support. However, it will be appreciated that in some example embodiments, one or more of the first through fourth protruding members 308,310,311, 312 may not be integral with the first and second body parts 302,304, and may instead be attached to the first and second body parts 302,304. In an example embodiment, the first through third protruding members 308,310,311 are integrally formed with the first and second body parts 302,304 and the fourth protruding member 312 is attached to the first and second body parts 302,304.

In some example embodiments, the housing 300 has a roughly protruded cylindrical shape in which a central part of the housing 300 is wider than an outer part of the housing 300. However, it will be appreciated that variations may be made to the shape of the housing 300 without departing from the scope of the disclosed concept. It will also be appreciated that variations to the shapes of any other features of the housing 300 may be modified without departing from the scope of the disclosed concept. It will further be appreciated that one or more features may be added, removed, or modified without departing from the scope of the disclosed concept.

Figure 15:
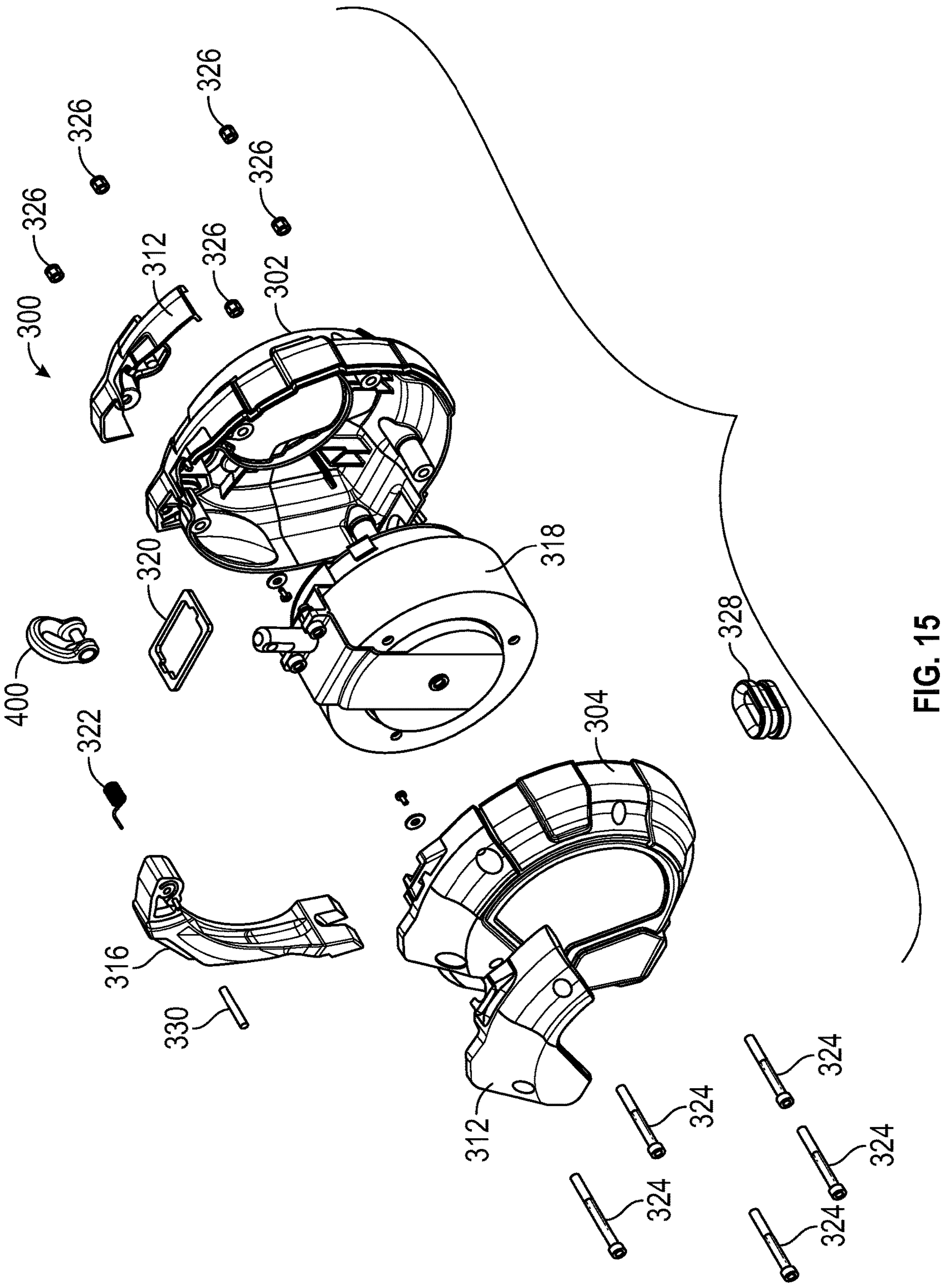
FIG. 15 is an exploded view of a self-retracting lifeline housing in accordance with an example embodiment of the disclosed concept.

FIG. 15 is an exploded view of the housing 300 in accordance with an example embodiment of the disclosed concept. As shown in FIG. 15, the first and second body parts 302,304 may come together to form the housing. One or more fasteners, for example and without limitation, nuts 326 and bolts 324 may be used to attach the first and second body parts 302,304 together. A torsion spring 322 may also be employed in conjunction with the retractable handle 316 to bias the retractable handle 316 to the retracted position. Other parts, such as a bracket 320, a shaft 330, and a pass-through member 328 may also be employed. In FIG. 15, a retracting device 318 is shown. The retracting device 318 may be disposed in the area within the first and second body parts 302,304 (i.e., within the housing 300). A similar retracting device may also be employed with the housing 100 shown in FIG. 1. While FIG. 15 shows some of the parts that may be employed with the housing 300, it will be appreciated that parts may be added, removed, or modified without departing from the scope of the disclosed concept.

Figure 16:
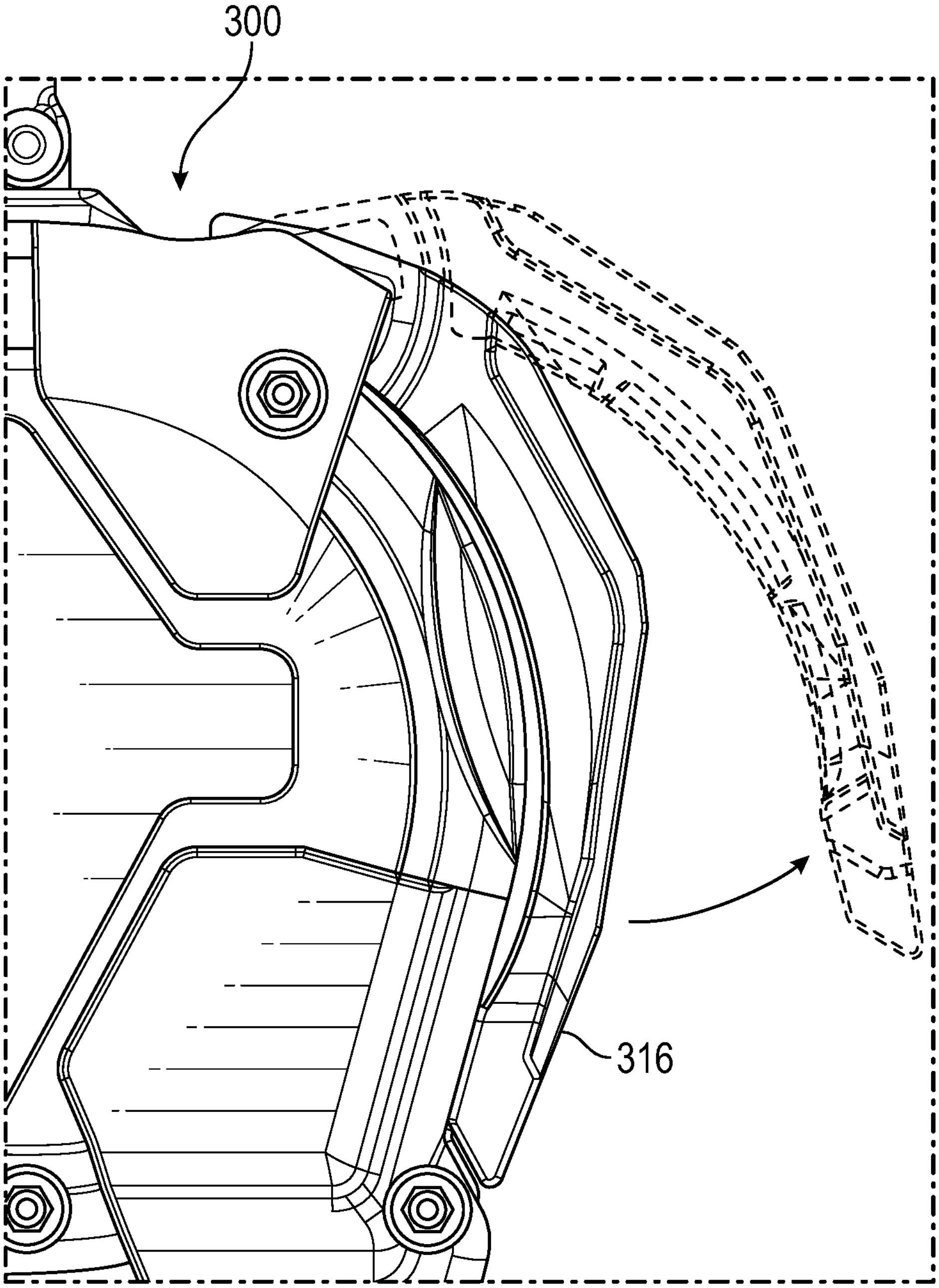
FIG. 16 is a view of a retractable handle included in a self-retracting lifeline housing in accordance with an example embodiment of the disclosed concept.

FIG. 16 is a view of the retractable handle 316 moving from the retracted position to the non-retracted position in accordance with an example embodiment of the disclosed concept. As shown in FIG. 16, the retracted position of the retractable handle 316 is shown in solid lines and the non-retracted position of the retractable handle 316 is shown in dashed lines. In the non-retracted position, the unattached end of the retractable handle 316 is spaced apart from the body of the housing 300.

As described herein, some example embodiments of the disclosed concept provided a multi-stepped geometry which provides protection for a label area and a self-retracting lifeline in general. Protruding members are protect edges of the housing from impacts and provide structural support for the housing. While these are just some advantages provided by some embodiments of the disclosed concept, it will be appreciated that other advantages may be provided as well.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A housing for a self-retracting lifeline comprises:

an outer area disposed on a portion of a first side of the housing, the outer area being planar;

a label area stepped down from the outer area, an outer perimeter of the label area corresponding to an inner perimeter of the outer area;

a number of protruding members disposed at least on a portion of the first side or an opposite second side of the housing and being stepped up from the outer area;

a retractable handle having a first end attached to a top side of the housing and a second end unattached to the housing, the retractable handle movable between a retracted position in which the second end is closer to a back side of the housing and a non-retracted position in which the second end is further from the back side of the housing, wherein the retractable handle is biased to the retracted position; and a torsion spring structured to bias the retractable handle to the retracted position.

2. The housing of claim 1, wherein the number of protruding members includes a first protruding member disposed on the first side, a bottom, and the second side of the housing, wherein the first protruding member extends across at least a portion of bottom edges of the housing.

3. The housing of claim 1, wherein the number of protruding members includes:

a second protruding member disposed on the first side of the housing and a front side of the housing, the second protruding member extending across at least a portion of a first front edge of the housing; and a third protruding member disposed on the second side of the housing and the front side of the housing, the second protruding member extending across at least a portion of a second front edge of the housing.

4. The housing of claim 3, wherein at least one of the second and third protruding members includes a body portion and at least two prong portions extending from the body portion, wherein the at least two prong portions are disposed at least partially on the front side of the housing.

5. The housing of claim 1, wherein the number of protruding members includes a fourth protruding member disposed on the first side, the top side, and the second side of the housing, wherein the fourth protruding member extends across at least a portion of top edges of the housing, and wherein the fourth protruding member includes an opening on the top side of the housing.

6. The housing of claim 1, wherein the number of protruding members includes:

a first protruding member disposed on the first side, a bottom, and the second side of the housing, wherein the first protruding member extends across at least a portion of bottom edges of the housing;

a second protruding member disposed on the first side of the housing and a front side of the housing, the second protruding member extending across at least a portion of a first front edge of the housing;

a third protruding member disposed on the second side of the housing and the front side of the housing, the second protruding member extending across at least a portion of a second front edge of the housing; and a fourth protruding member disposed on the first side, the top side, and the second side of the housing, wherein the fourth protruding member extends across at least a portion of top edges of the housing, and wherein the fourth protruding member includes an opening on the top side of the housing.

7. The housing of claim 1, wherein the number of protruding members includes:

a second protruding member disposed on the first side, a front side, and the second side of the housing, the second protruding member extending across at least a portion of front edges of the housing; and a third protruding member disposed on the first side, the front side, and the second side of the housing, the third protruding member extending across at least a portion of front edges of the housing and having a shorter length than the second protruding member.

8. The housing of claim 1, wherein the number of protruding members includes:

a first protruding member disposed on the first side, a bottom, and the second side of the housing, wherein the first protruding member extends across at least a portion of bottom edges of the housing;

a second protruding member disposed on the first side, a front side, and the second side of the housing, the second protruding member extending across at least a portion of front edges of the housing; and a third protruding member disposed on the first side, the front side, and the second side of the housing, the third protruding member extending across at least a portion of front edges of the housing and having a shorter length than the second protruding member; and a fourth protruding member disposed on the first side, a top side, and the second side of the housing, wherein the fourth protruding member extends across at least a portion of top edges of the housing, and wherein the fourth protruding member includes an opening on the top side of the housing.

9. The housing of claim 1, wherein the outer perimeter of the label area includes a first perimeter section having an arc shape, second and third perimeter sections angled toward each other, and third and fourth perimeter sections substantially parallel to each other.

10. The housing of claim 1, further comprising:

a first body part; and a second body part attached to the first body part, wherein at least one of the number of protruding members includes a first portion integrally formed with the first body part and a second portion integrally formed with the second body part.

11. The housing of claim 10, wherein at least one of the number of protruding members is attached to at least one of the first body part and the second body part.

12. The housing of claim 1, wherein a shape of an interior side of the retractable handle corresponds to a shape of the back side of the housing.

13. A self-retracting lifeline comprises:

a housing including:

an outer area disposed on a portion of a first side of the housing, the outer area being planar;

a label area stepped down from the outer area, an outer perimeter of the label area corresponding to an inner perimeter of the outer area;

a number of protruding members disposed at least on a portion of the first side or an opposite second side of the housing and being stepped up from the outer area;

a retractable handle having a first end attached to a top side of the housing and a second end unattached to the housing, the retractable handle movable between a retracted position in which the second end is closer to a back side of the housing and a non-retracted position in which the second end is further from the back side of the housing, wherein the retractable handle is biased to the retracted position; and a torsion spring structed to bias the retractable handle to the retracted position;

a retractable device disposed within the housing;

a first attachment mechanism attached proximate a top of the housing;

a lifeline extending from the housing;

an energy absorber attached to the lifeline; and a second attachment mechanism attached to the energy absorber.

14. The self-retracting lifeline of claim 13, wherein a shape of an interior side of the retractable handle corresponds to a shape of the back side of the housing.

15. The self-retracting lifeline of claim 13, wherein the number of protruding members includes a first protruding member disposed on the first side, a bottom, and the second side of the housing, wherein the first protruding member extends across at least a portion of bottom edges of the housing.

16. The self-retracting lifeline of claim 13, wherein the number of protruding members includes:

a second protruding member disposed on the first side of the housing and a front side of the housing, the second protruding member extending across at least a portion of a first front edge of the housing; and a third protruding member disposed on the second side of the housing and the front side of the housing, the second protruding member extending across at least a portion of a second front edge of the housing.

17. The self-retracting lifeline of claim 13, wherein the number of protruding members includes a fourth protruding member disposed on the first side, the top side, and the second side of the housing, wherein the fourth protruding member extends across at least a portion of top edges of the housing, and wherein the fourth protruding member includes an opening on the top side of the housing.

* * * * *